Figure 1:
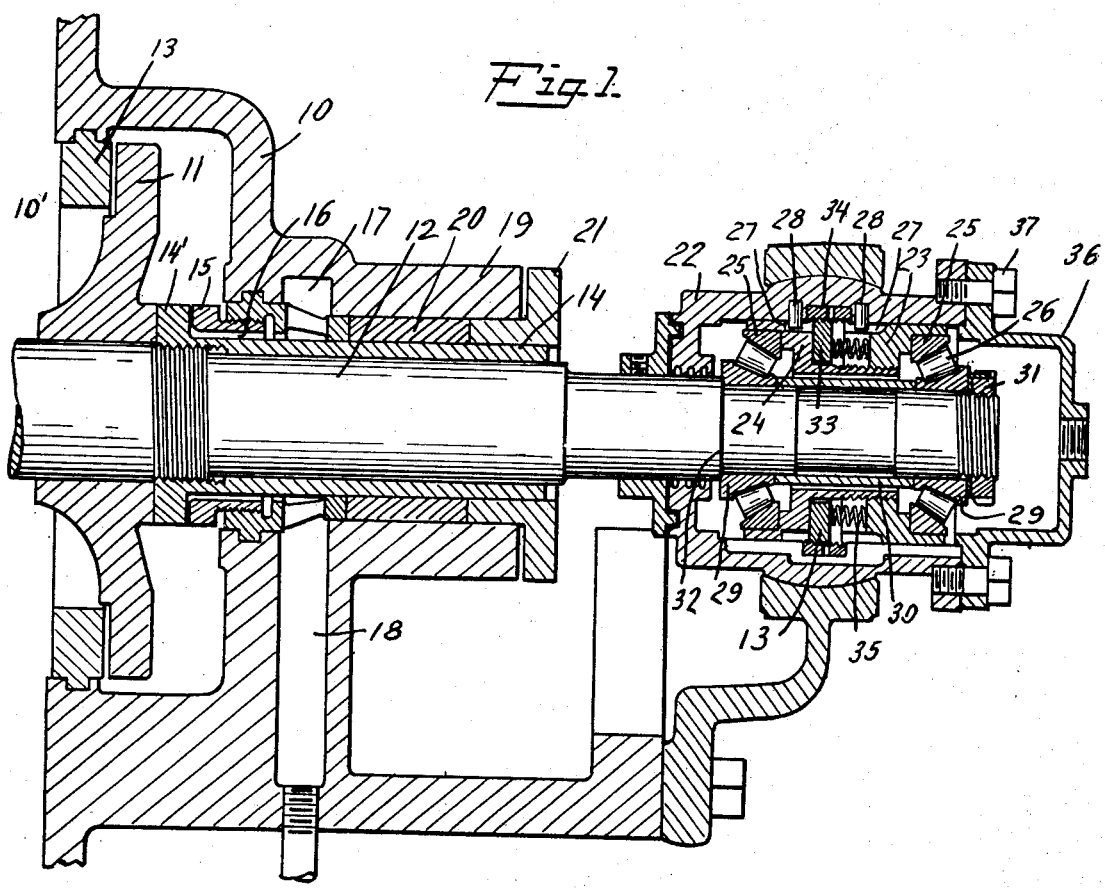

Feb. 6, 1934.   E. W. HELLER   1,946,439
CENTRIFUGAL PUMP BEARING
Filed Aug. 9, 1930

INVENTOR
Edgar W. Heller
BY
ATTORNEYS

Patented Feb. 6, 1934

1,946,439

UNITED STATES PATENT OFFICE 1,946,439

CENTRIFUGAL PUMP BEARING

Edgar W. Heller, Newark, N. J.

Application August 9, 1930. Serial No. 474,099

15 Claims. (Cl. 308—135)

This invention relates to centrifugal pumps, and is concerned more particularly with the provision of a mounting for thrust bearing for hydraulically balanced pumps with single-suction impellers.

In centrifugal pumps of the type above referred to there is an inherent thrust toward the suction upon the rotor during operation, due mostly to the difference in pressure at opposite sides of the impeller eye area. To take care of this thrust it is the practice to provide such pumps with a hydraulic balance either calculated or automatic, this balance being effected by a balance disk or drum on which a counter thrust is set up. One form of automatic hydraulic balance is known as the two-throttle type, the rotor being mounted so that it is free to move axially between two throttle seats. The relative opening of the throttles varies the amount of counter thrust and accordingly the automatic action of the balance depends on an axial shifting of the rotor.

Such an automatic hydraulic balance is generally satisfactory to balance the thrust, but the balance may become inoperative when the pump has no head, as when it is starting or being shut down, and the balance may also cease to function under extraordinary conditions, such as loss of fluid or by reason of becoming steam- or airbound. When this occurs, the balance disk and the seats with which it cooperates to provide the throttling action act as a positioning means for the rotor. These parts are poorly adapted for the purpose, and, in the absence of means to prevent it, there may be an unlubricated metal-to-metal contact, which may cause rapid wear.

The object of this invention is to provide the shaft of such a pump with a thrust bearing which will position the rotor within the narrow limits required and will permit such axial movement as may be necessary for the operation of the hydraulic balance the instant the thrust becomes greater than the capacity of the bearing.

This thrust bearing is provided with one or more springs under initial compression, and these springs resist the movement of the bearing and shaft in one direction. The bearing is capable of axial adjustment so as to position the balance disk element to run clear of both throttle seats, so that when the pump operates under abnormal conditions and no head is being developed the bearing protects those parts which constitute the hydraulic balance. When the head develops, accompanied by inherent thrust, the springs in the bearing permit the rotor to move to the extent necessary to render the hydraulic balance effective. If the balance becomes inoperative at any time the springs again return the rotor to its original position, in which it lies clear of the seats.

The provision of the thrust bearing serves a further useful purpose in that it permits the play of the balancing element between the throttle seats to be substantially reduced with perfect safety. Thus the loss of fluid through the balance can be considerably reduced and the efficiency of the pump thereby increased.

Figure 2:
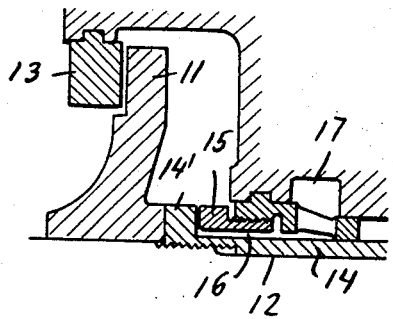
Figure 3:
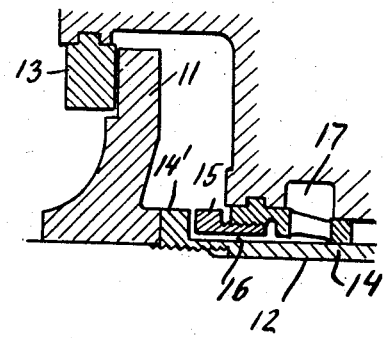

For a better understanding of the invention reference may be had to the accompanying drawing, in which Fig. 1 illustrates in longitudinal cross-section a part of the pump with the thrust bearing in place and Figs. 2 and 3 are schematic views illustrating the operation of the balance.

Referring now to the drawing, the device is illustrated as including a balance chamber 10' at one end of the pump casing 10, in which chamber operates the disk element 11 forming part of a hydraulic balance. The casing 10 is provided with a circular seat 13 near the periphery of the element and on the pressure side. This seat cooperates with one face of the element 11 to constitute one of the throttles. Mounted on the shaft 12 is a sleeve 14 having a flange 14' which lies near the hub of the element 11, and a circular seat 15 is disposed adjacent this flange and with it forms the second throttle. The passage 16 between the seat 15 and the sleeve 14 leads to a chamber 17 from which leads a waste space 18.

When the pump is put in operation and head develops, inherent thrust is at once generated which tends to move the balance disk 11 toward the seat 13 as illustrated in Fig. 3. At the same time over-balance is caused by counter-thrust developed on the pressure side of the disk 11, which tends to move the disk away from seat 13 and open the first throttle and close the second throttle. The flow of pressure into the chamber reduces the pressure difference on the two sides of the disk 11 and thus reduces the counter-thrust. Movement of the disk toward the seat 13 reduces inflow into the chamber, increases outflow and increases the pressure difference and the counter-thrust. Under normal conditions the impeller element runs clear of both seats and the impeller likewise is thus kept from contact with the walls of its casing.

The end of the shaft 12 passes out through the hub 19 of chamber 10', leakage being prevented by means of packing 20 held in place by gland nut 21. The projecting end of the shaft is supported in a thrust bearing.

This bearing includes a housing 22 within which is mounted a retainer formed of two members 23 and 24 threaded one within the other and permitting certain springs to be placed in position under initial tension as the parts are assembled. At opposite ends of the retainer are outer raceways 25 for roller bearings 26. The retainer has a keyway 27 in which project keys 28 mounted in the wall of the housing. These keys hold the bearing adjusted and prevent the retainer from rotating. Mounted on the shaft 12 are inner raceways 29 for the bearings, these raceways being separated by a spacing sleeve 30. The raceways 29 with the spacing sleeve are held in place by a nut 31 threaded on the end of the shaft, the nut holding the raceways and spacing sleeve assembly locked against a shoulder 32 formed on the shaft. It is evident that ball bearings or a plain thrust bearing may be substituted in place of the roller bearings illustrated.

The two parts 23 and 24 which form the retainer have spaced portions between which lies an abutment collar 33 threaded into a ring 34 closely fitting in a groove in the wall of the housing 22. Bearing against one face of the abutment 33 and against the part 23 are springs 35. One or more of such springs may be used and they act to force the retainer normally toward the right (Fig. 1) and hold the part 24 firmly against the abutment 33. This holds the rotor in a fixed axial position to the right, due to the initial compression of the springs. By turning the threaded ring 34 the abutment 33 may be moved axially in relation to the housing 22, thus permitting the shaft to be initially positioned so that the balance disk carried thereby is positioned properly with reference to the throttle seats 13 and 14. The end of the thrust bearing is closed by a cover 36 secured to the housing 22 by the screws 37.

Under normal operation the thrust bearing carries a load determined by the strength of the springs which is equal to its safe capacity. When this load is less than the strength of the springs they maintain the retainer member 24 against the abutment 33. As inherent thrust develops, the bearing load increases until the initial compression of the springs is exceeded and thereupon the springs are further compressed and the bearing assembly moves in the direction of the thrust, permitting the shaft and balance disk element to have a similar movement. This tends to close the throttle between the balance disk and seat 13 and to open the other throttle so that the hydraulic balance comes into operation to balance the inherent thrust. If the inherent thrust becomes less than the strength of the springs they move the thrust bearing assembly, the shaft and the balance disk element to the right (Fig. 1) and the limit of such movement is reached when the retainer part 24 engages the abutment 33. In that position the balance disk element is held clear of its seats 13 and 15 and therefore there is no wear on these parts.

It will be seen from the foregoing that I have provided a thrust bearing assembly which when used in cooperation with a hydraulic balance achieves the desired result of protecting the throttle seats while at the same time permitting the necessary axial swing of the balance disk element required to make the hydraulic balance function. This thrust bearing cooperates with the hydraulic balance and prevents the balance disk element from being forced against one or the other of the throttle seats so that wear might result, when abnormal conditions arise. The load that the bearing carries is determined by the initial compression of the springs and the adjustment of the balance disk element between the seats may be carried on without in any way affecting any other adjustment. Accordingly there is no difficulty in initially positioning the balancing disk relatively to the seats. At the same time the axial movement of the balance disk may be substantially reduced, and this reduces the loss of fluid between the throttles and thus adds to the efficiency of the pump.

What I claim is:

1. In a centrifugal pump containing an impeller and a hydraulic balance mounted on a shaft, a thrust bearing for the shaft including a retainer movable longitudinally but prevented from rotating, a normally fixed abutment engageable by a part of the retainer for positively limiting the movement of the bearing and shaft in one direction, and resilient means resisting said movement in the other direction.

2. In a centrifugal pump containing an impeller and a hydraulic balance mounted on a shaft, a thrust bearing for the shaft including a retainer movable longitudinally but prevented from rotating, a normally fixed abutment engageable by a part of the retainer for positively limiting the axial movement of the shaft in one direction, said abutment being adjustable to position the shaft, and resilient means resisting the movement of the shaft in the other direction.

3. In a centrifugal pump containing an impeller and a hydraulic balance mounted on a shaft, a thrust bearing for the shaft including a retainer movable longitudinally with the bearing and shaft but prevented from rotating, a normally fixed abutment engageable by a part of the retainer for positively limiting the movement of the shaft in one direction, and resilient means acting on the abutment and retainer and resisting said movement in the other direction.

4. In a centrifugal pump containing an impeller and a hydraulic balance mounted on a shaft, a thrust bearing for the shaft including a retainer movable longitudinally with the shaft but prevented from rotating, a normally fixed abutment member cooperating with the retainer for positively limiting the movement of the shaft in one direction, and one or more springs engaging the abutment and retainer and resisting said movement in the other direction.

5. In a centrifugal pump containing an impeller and a hydraulic balance mounted on a shaft, a thrust bearing for a shaft movable in the direction of the axis of the shaft, said bearing including a retainer free to move longitudinally with the bearing and shaft but prevented from rotating, a normally fixed abutment engageable by a part of the retainer for positively limiting the movement of the bearing in one direction and resilient means tending to force the bearing in the opposite direction, and normally holding said part of the retainer in engagement with the abutment.

6. In a centrifugal pump containing an impeller and a hydraulic balance mounted on a shaft, a thrust bearing for the shaft movable in the direction of the axis of the shaft, said bearing including a retainer free to move longitudinally with the bearing and shaft but prevented from rotating, an abutment lying between portions of said members and engageable by one member for positively limiting the movement of the bearing and shaft in one direction, and resilient means acting on said abutment and the other member to resist said movement in the other direction.

7. In a centrifugal pump containing an impeller and a hydraulic balance mounted on a shaft, a thrust bearing for the shaft movable in the direction of the axis of the shaft, said bearing including a retainer free to move longitudinally but prevented from rotating, an abutment engaging the retainer and limiting the movement of the bearing and the shaft in one direction, and resilient means acting on said abutment and the retainer member and resisting said movement in the other direction, said resilient means being under initial compression.

8. In a centrifugal pump containing an impeller and a hydraulic balance mounted on a shaft, a thrust bearing for the shaft movable in the direction of the axis of the shaft, said bearing including a retainer made up of a pair of members, said retainer being free to move longitudinally but prevented from rotating, an abutment mounted for adjustment and engaging one of said members to limit the movement of the bearing in one direction, and resilient means engaging said abutment and said other member and resisting said movement in the other direction, the adjustment of said abutment determining the position of the shaft.

9. In a centrifugal pump containing an impeller and a hydraulic balance mounted on a shaft, a thrust bearing for the shaft movable in the direction of the axis of the shaft, said bearing including a retainer made up of a pair of members, said retainer being free to move longitudinally but prevented from rotating, an abutment mounted for adjustment and engaging one of said members to limit the movement of the bearing and shaft in one direction, the springs engaging said abutment and said other member and resisting said movement in the other direction, said abutment being adjustable to vary the position of the shaft.

10. A thrust bearing assembly for a shaft comprising an abutment, a plurality of springs engaging said abutment and a part of said bearing to resist movement of the bearing in one direction and means for varying the initial compression of said springs, said abutment being adjustable in a direction lengthwise of the shaft without altering said compression.

11. A thrust bearing comprising a retainer made up of a pair of relatively adjustable members, a normally fixed abutment engaged by one member, and normally compressed springs between said abutment and the other member, the adjustment of the members relative to each other permitting variation in the initial compression of said springs.

12. A thrust bearing comprising a retainer movable longitudinally but prevented from rotating, a normally fixed abutment engageable by a part of said retainer for positively limiting the movement of the retainer in one direction and springs resisting the movement of the retainer in the other direction.

13. In a centrifugal pump containing an impeller and a hydraulic balance mounted on a shaft, a thrust bearing for the shaft movable in the direction of the axis of the shaft, an abutment limiting the movement of the bearing and shaft in one direction and springs acting on said abutment and a part of said bearing and resisting movement of the bearing and the shaft in the other direction, said abutment being adjustable to vary the position of the bearing and shaft.

14. A thrust bearing comprising a pair of relatively adjustable retainer members, an abutment between spaced parts, one on each member, and springs engaging one face of said abutment and said part on one of said members, said part on the other member being held against another face of said abutment by the action of the springs.

15. In a centrifugal pump containing an impeller and a hydraulic balance mounted on a shaft, a thrust bearing for said shaft comprising an abutment engaging a part of said bearing to limit the movement thereof in one direction and a plurality of springs engaging said abutment and another part of the bearing to resist movement of said bearing in the other direction, and means for varying the initial compression of said springs.

EDGAR W. HELLER.